United States Patent [19]
Archer

[11] 3,715,749
[45] Feb. 6, 1973

[54] MULTI-BEAM RADIO FREQUENCY SYSTEM

[75] Inventor: Donald H. Archer, Santa Barbara, Calif.

[73] Assignee: Raytheon Company, Lexington, Mass.

[22] Filed: May 11, 1971

[21] Appl. No.: 142,224

[52] U.S. Cl. ............343/5 R, 343/6.8 R, 343/18 D, 343/100 TD
[51] Int. Cl. .................................................G01s 9/02
[58] Field of Search .......343/5 R, 6.5 R, 6.8 R, 18 D, 343/100 CS, 100 TD

[56] References Cited

UNITED STATES PATENTS

| | | | |
|---|---|---|---|
| 3,500,411 | 3/1970 | Kiesling | 343/100 TD |
| 3,611,381 | 10/1971 | Preikschat | 343/100 TD |

*Primary Examiner*—T. H. Tubbesing
*Attorney*—Philip J. McFarland, Joseph P. Pannone and Richard M. Sharkansky

[57] ABSTRACT

A transmitting/receiving system for radio frequency energy is shown, such system incorporating a multi-beam array antenna and appropriate control circuitry to adapt the system to operation simultaneously as a radar, as a relay or as a transponder.

4 Claims, 1 Drawing Figure

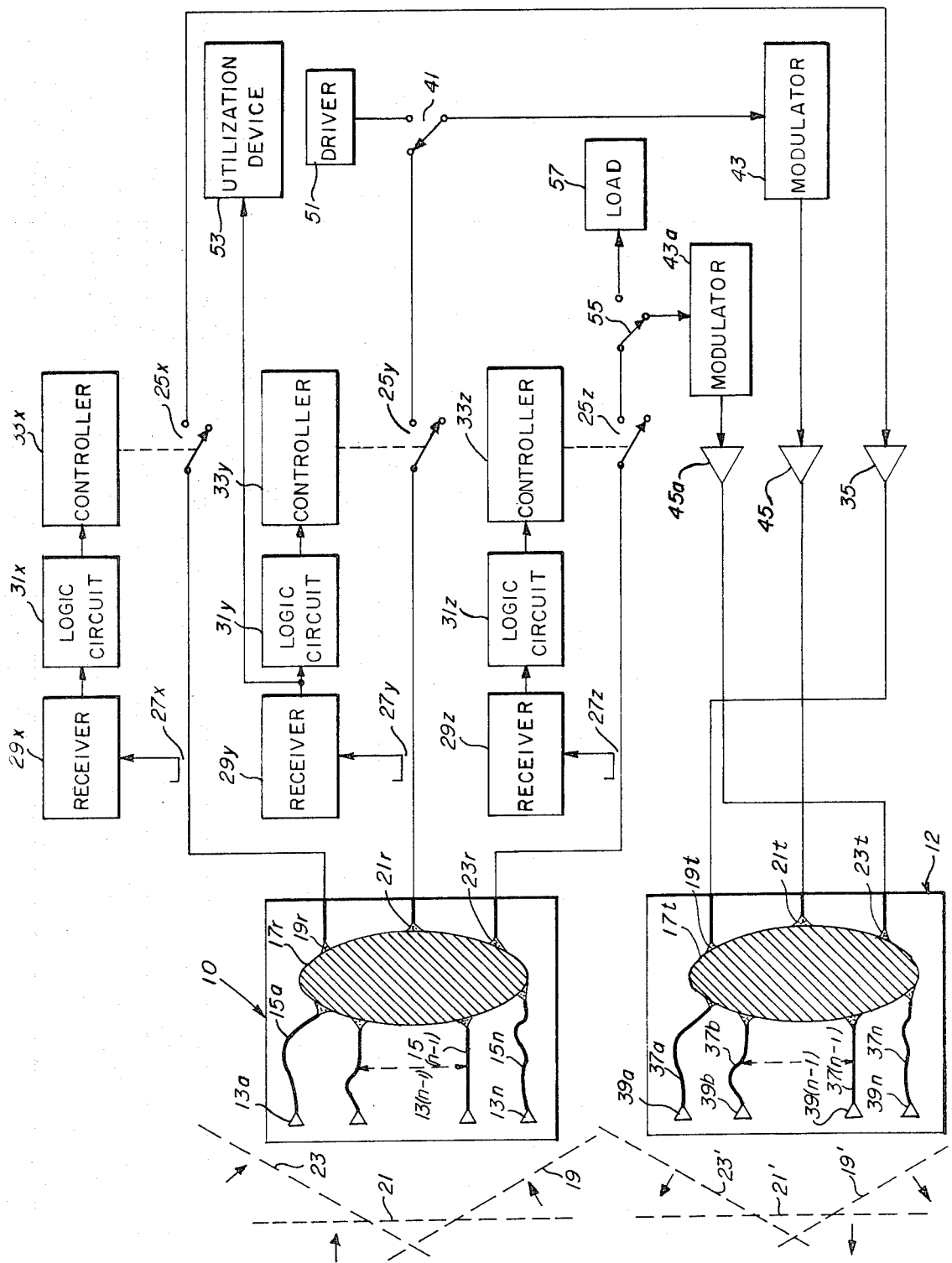

MULTI-BEAM RADIO FREQUENCY SYSTEM

BACKGROUND OF THE INVENTION

This invention pertains generally to radar systems and particularly to radar systems which may be operated in different modes.

It is known in the art that retro-directive antenna arrays in combination with other elements may be used, either with or without amplification, to return received electromagnetic energy to a transmitting source. For example, the well-known "Van Atta" array, in which pairs of antenna elements are connected together by transmission lines of appropriate lengths, have an inherent ability to "retro-direct" received electromagnetic energy back to the source of such energy.

While the "Van Atta" array, or any of its many known variations, is effective in retro-directing electromagnetic energy, there are many instances in which the use of such an array is not desirable. For example, if a transponder, to be used as an active beacon, is designed incorporating a Van Atta array, it has been found that such a transponder will respond to all interrogating sources, regardless of the direction thereof. Therefore, even though it is desired that the beacon respond to received signals from only one of the interrogating sources, the beacon will respond to all. Obviously, then, the retransmitting portion of the beacon must have sufficient power to produce usable retro-directive reply signals for more than one interrogating source. Such a requirement, in turn, requires that the retransmitting portion of the beacon be larger than it would have to be if the beacon could be made to be responsive to only selected ones of a number of interrogating sources.

A different problem arises when a Van Atta array, or any variation thereof, is used in a passive system, i.e., in a system which is designed to distinguish between interrogating sources by distinguishing between the directions of arrival of electromagnetic energy from such sources. For example, if radio direction finding is desired, no type of Van Atta array may be used because, in the receiving mode, all such arrays are inherently insensitive to the direction of arrival of received energy. For this reason, it has been customary, according to the art, not to use a Van Atta array for radio direction finding but rather to use an antenna whose beam, or beams, may be scanned. It is evident, however, that such an approach makes it necessary to accept the fact that, on occasion, interrogating sources whose direction should be determined, will not be because the antenna beam, or beams of the receiving device will not be properly oriented.

Therefore, it is a primary object of this invention to provide an improved array antenna, in combination with appropriate receiving and transmitting elements, to provide a system which may operate in either an active or a passive mode.

Another object of this invention is to provide an improved array antenna which may be operated selectively to respond to predetermined ones of spatially separated interrogating sources.

Still another object of this invention is to provide an improved array antenna which may be equally and simultaneously responsive to interrogating signals from any one of a number of directions.

These and other objects of this invention are attained generally by providing, in combination: a receiving multi-beam antenna array, each such array having an antenna pattern consisting of simultaneously existing, stationary and overlapping beams; receiving means connected to the receiving multi-beam antenna array in such a manner as to provide different received signal outputs, each one of such outputs corresponding to a signal received in a different one of the receiving multi-beam antenna array beams; logic means responsive to the signal outputs of the receiving means for providing control signals to actuate the transmitting multi-beam antenna array to retro-direct energy therefrom to any selected ones of the sources of received energy and/or to actuate indicating means to show which ones of the beams in the receiving multi-beam antenna array received energy.

For a more complete understanding of this invention, reference is now made to the accompanying description of a preferred embodiment of this invention, as illustrated by the accompanying drawing, the single FIGURE of which is a block diagram of a system according to my inventive concepts.

Referring now to the drawing it may be seen that a system according to this invention here comprises a receiving multi-beam array antenna 10 and a transmitting multi-beam array antenna 12, such two antennas being similar in construction and connected together in such a manner as to be elements in a system having different modes of operation. For simplicity, it has been elected to show array antennas having three simultaneously existing beams, although it should be recognized that a greater number of beams would ordinarily be desirable. Thus, the receiving multi-beam array antenna 10 includes a linear array of antenna elements 13a through 13n, a similar plurality of transmission line 15a through n, a parallel-plate lens 17r and three feed ports 19r, 21r, 23r disposed along an arc of best focus of the parallel-plate lens 17r. As is known, the disposition of the antenna elements 13a through 13n, the length of each one of the transmission lines 15a through 15n and the configuration of the parallel-plate lens 17r may be varied so that the electrical length of the paths from any one of the feed ports 19r, 21r, 23r to points along a planar wavefront of radio frequency energy in any one of the three beams thereof are the same. That is, the length of the electrical path from feed port 19r to planar wavefront 19 is the same for radio frequency energy entering any one of the antenna elements 13a through 13n; the length of the electrical path from feed port 21r to any point on planar wavefront 21 is the same; and the length of the electrical path from feed port 23r to any point on planar wavefront 23 is the same.

Considering first radio frequency energy in the beam represented by wavefront 19, it will be noted that portions of such energy fall successively on antenna elements 13n through 13a and that each one of such succeeding portions will be guided, through a different one of the transmission lines 15n through 15a, to the parallel-plate lens 17r. The spacing between successive antenna elements, the length of each transmission line and the shape of the parallel-plate lens is such that each portion of the radio frequency energy in the beam represented by wavefront 19 is "in phase" at feed port 19r while each portion of such energy arriving at feed ports 21r, 23r is "out of phase". That is, the vectorial addition of the "in phase" portions results in a maximum composite signal at feed port 19r and the vectorial addition of the "out of phase" portions results in composite signals at feed ports 21r, 23r which are substantially less, say in the order of 14 db down, than such maximum composite signal.

Similarly, portions of the radio frequency energy in the beam represented by wavefront 21, upon passing through the antenna elements 13a through 13n, transmission lines 15a through 15n and the parallel-plate lens 17r are "in phase" at feed port 21r and "out of phase" at feed ports 19r, 23r. Still similarly, portions of the radio frequency energy in the beam represented by wavefront 23 are "in phase" at feed port 23r and "out of phase" at feed ports 19r, 21r.

The radio frequency energy at feed port 19r is here fed, through a conventional transmission line (not numbered) to a radio frequency switch 25x, as a p-i-n diode. A directional coupler 27x is disposed along such line to direct a portion of the radio frequency energy to a receiver 29x. The output signal of the latter, in turn, is fed to a logic circuit 31x, as a conventional threshold circuit, to actuate a controller 33x. The latter is also conventional, for example, being a transistor switching circuit to produce a control signal for the radio frequency switch 25x to cause that element to complete the transmission line from feed port 19r to an amplifier 35, as a traveling wave tube. The output signal of the latter (which obviously is an amplified version of the radio frequency signal in the beam represented by wavefront 19) is passed, as shown, to a feed port 19t. From that feed port, the radio frequency energy is distributed, through parallel-plate lens 17t and transmission lines 37a through 37n as shown, to antenna elements 39a through 39n. Because, as noted hereinbefore, the just-mentioned elements making up the transmitting multi-beam array antenna 12 are the same as the elements making up receiving multi-beam array antenna 10, the interaction between the portions of the radio frequency energy radiated from the antenna elements 39a through 39n is such as to create a retrodirected beam (represented by the wavefront 19' in the FIGURE).

Referring now back to the condition in which "in phase" radio frequency energy is present at feed port 21r, it may be seen that such energy is first caused to operate a radio frequency switch 25y. Thus, a directional coupler 27y, a receiver 29y, logic circuitry 31y and a controller 33y combine to actuate radio frequency switch 25y when energy in a beam represented by the planar wavefront 21 is received. A portion of such received signals, therefore, is passed through a switch 41, here manually actuable, to a modulator 43. The latter which may take any one of many known forms, impresses a desired modulation signal on such portion of the received signals. The output signals from the modulator are passed, through an amplifier 45 to feed port 21t. The energy emanating from the feedport 21t is passed, through the parallel-plate lens 17t and the transmission lines 37a through 37n, to the antenna elements 39a through 39n to be radiated therefrom in a beam as indicated by the planar wavefront 21'. When the switch 41 is moved from its illustrated position, a driver 51 is then connected to the modulator 43. The driver 51, for example, may be a radio frequency oscillator. Thus, coded signals may be transmitted in the beam represented by planar wavefront 21'. Such coded signals, upon reflection from any objects are returned to the receiving multi-beam array antenna 10 and are processed finally to actuate a utilization device 53, as an indicator. In other words, the illustrated arrangement may be operated as a conventional radar.

Referring now to the circuitry disposed between feed port 23r and feed port 23t, it may be seen that such circuitry is the same as that just described, except that switch 41 is replaced by switch 55 and driver 51 is replaced by load 57 (which may simply be a detector and an indicator of any conventional type). It is evident, therefore, that when switch 55 is moved from its illustrated position, an indication that radio frequency energy is being received from the direction indicated by the planar wavefront 23 will be obtained. That is, the circuitry acts as a direction finder without retransmitting received energy.

The flexibility of the disclosed system will be immediately apparent to one of skill in the art. Thus, it is apparent that the system may be rendered nonresponsive to radio frequency energy in any selected beam simply by inhibiting operation of the logic circuitry associated with the path of received radio frequency energy in such a beam. Further, the various channels between the receiving and transmitting multi-beam array antennas may be interconnected so that radio frequency energy received on one beam may be transmitted on another. That is, the illustrated embodiment may be used as a relay between two separate stations. Still further, there is no absolute requirement that the array antennas be identical. For example, the amplifiers 35, 45, 45a could be replaced by an amplifier in each one of the transmission lines 37a through 37n. It is felt, therefore, that this invention should not be restricted to its disclosed embodiment but rather should be limited only by the spirit and scope of the appended claims.

What is claimed is:

1. In a transmitting/receiving system wherein receiving and transmitting multi-beam array antenna assemblies are used to form similarly directed beams of radio frequency energy, each one of such assemblies including a feed port corresponding to a different one of such beams, control circuitry comprising:
   a. connecting means, including a transmission line and a radio frequency switch in circuit between selected pairs of feed ports in the receiving and the transmitting multi-beam array antenna assemblies, for providing a path for radio frequency energy between the feed ports in each selected pair thereof; and,
   b. switch control means, responsive to the level of radio frequency energy at each different feed port in the receiving multi-beam array antenna assembly, for actuating the corresponding radio frequency switch to complete the path for radio frequency energy between each selected pair of feed ports when such level exceeds a predetermined level.

2. Control circuitry as in claim 1 wherein the switch control means includes:

a. a direction coupler disposed in each transmission line from the receiving multi-beam array antenna assembly for sensing radio frequency energy from each one of the feedports in such assembly; and,
b. a controller for each radio frequency switch, such controller being responsive to the level of radio frequency energy out of the directional coupler to open the radio frequency switch when such level is less than the predetermined level.

3. Control circuitry as in claim 2 wherein the connecting means includes, additionally:

a. a radio frequency amplifier responsive to the radio frequency energy passing through the radio frequency switch, for amplifying such energy before it is applied to the feed port in the transmitting multi-beam array antenna assembly.

4. Control circuitry as in claim 3 wherein the connecting means includes, additionally, means for modulating the radio frequency energy passing through the radio frequency switch.

* * * * *